(12) United States Patent
Horley et al.

(10) Patent No.: US 8,468,393 B2
(45) Date of Patent: Jun. 18, 2013

(54) TRIGGERING DIAGNOSTIC OPERATIONS WITHIN A DATA PROCESSING APPARATUS (75) Inventors: John Michael Horley, Cambridge (GB); Andrew Brookfield Swaine, Cambridge (GB)

(73) Assignee: ARM Limited, Cambridge (GB)

( * ) Notice: Subject to any disclaimer, the term of this patent is extended or adjusted under 35 U.S.C. 154(b) by 1638 days.

(21) Appl. No.: 11/819,697

(22) Filed: Jun. 28, 2007

(65) Prior Publication Data
US 2009/0006934 A1 Jan. 1, 2009

(51) Int. Cl.
*G06F 11/00* (2006.01)

(52) U.S. Cl.
USPC .................... 714/45; 714/46; 714/25

(58) Field of Classification Search
USPC ............... 714/30, 31, 45–47, 49–51
See application file for complete search history.

(56) References Cited

U.S. PATENT DOCUMENTS

| | | | |
|---|---|---|---|
| 7,428,602 B2 * | 9/2008 | Vageline et al. | 710/8 |
| 2004/0250164 A1 * | 12/2004 | Ahmad et al. | 714/30 |
| 2006/0195721 A1 * | 8/2006 | Moyer et al. | 714/30 |
| 2007/0101194 A1 * | 5/2007 | Lockwood et al. | 714/30 |

* cited by examiner

*Primary Examiner* — Scott Baderman
*Assistant Examiner* — Sarai Butler
(74) *Attorney, Agent, or Firm* — Nixon & Vanderhye P.C.

(57) ABSTRACT

A data processing apparatus is provided including diagnostic mechanism and comparator circuitry. The comparator circuitry is responsive to a signal indicative of execution of a block of program instructions to trigger any watchpoints or watch ranges within that block of program instructions. The relative ordering of the watchpoints or watch ranges is established by ordering characteristics associated therewith, such as programmable priority values, or an implicit ordering given by the storage location of the watchpoint or watch range.

35 Claims, 5 Drawing Sheets

TRIGGERING DIAGNOSTIC OPERATIONS WITHIN A DATA PROCESSING APPARATUS

TECHNICAL FIELD

The technology described in this application relates to the field of data processing systems, and more particularly, relates to the field of the triggering of diagnostic operations to be performed upon data processing systems in response to performed processing operations.

BACKGROUND

It is known to provide data processing systems with diagnostic mechanisms, such as debug mechanisms and trace mechanisms, for assisting in the development and debugging of hardware and software. The effectiveness of such systems is important in helping to reduce the time-to-market of new products.

One important characteristic of such diagnostic mechanisms is that they should not interfere and/or constrain the normal operation of the system. This is important for a variety of reasons. Diagnostic mechanisms will typically be used during design and development of a product, but will not be used when that product is performing its normal intended use as a production product. Accordingly, any constraint upon the performance of the system during such use of the production versions is significantly disadvantageous. Furthermore, there can be types of problems/bug which manifest themselves when the system is operating at full speed, but would not manifest themselves if the system was operating at a lower speed, or in some different manner, due to the presence and/or of the diagnostic mechanisms.

Known diagnostic mechanisms, such as the ETM trace mechanisms produced by ARM Limited of Cambridge, England, normally operate in response to the instruction-by-instruction (or access-by-access) activity of the system. The same is also true of the debug mechanisms provided in many known integrated circuits, such as those designed by ARM Limited of Cambridge, England. The ability to analyse the instruction-by-instruction behaviour of a system in order to diagnose problems and identify bugs is important to facilitate that diagnosis and identification. However, the level of intrusiveness in the system in permitting such instruction-by-instruction following is significant. This is particularly the case as processing speeds increase and systems become more complex, such as employing out-of-order execution and speculative execution.

SUMMARY

One aspect provides apparatus for performing data processing operations under control of a sequence of program instructions, said apparatus comprising:

block indicating circuitry responsive to processing of a block of program instructions to generate a block signal indicative of processing of a contiguous block of program instructions extending between a block-starting address and a block-ending address.

comparator circuitry coupled to said block indicating circuitry and responsive to said block signal to generate a trigger signal if at least one programmable address being watched by said comparator circuitry lies within said block of program instructions; and diagnostic circuitry coupled to said comparator circuitry and responsive to said trigger signal to perform a diagnostic operation.

In many circumstances, the need to follow the instruction-by-instruction behaviour of the processor for the purpose of triggering diagnostic operations is not in practice a necessity. A better expression of the nature of the instruction-by-instruction behaviour which needs to be tracked is that when analysing the results of the diagnostic operations performed, the user should be able to follow the behaviour on an instruction-by-instruction basis. However, such a view of the processing can be reconstructed retrospectively without requiring the diagnostic operations which are triggered during use of the data processing apparatus to actually follow the instruction-by-instruction behaviour. This significantly simplifies implementation and reduces the potentially performance constraining effects of diagnostic circuitry since it is possible to track the processing performed upon blocks of program instruction and generate block signals indicative of processing thereupon with those block signals being used in conjunction with appropriate comparator circuitry to trigger the diagnostic circuitry to perform a diagnostic operation when there is a match with an appropriate programmable address being watched by the comparator circuitry. As an example, following the processing on a block-by-block basis and triggering the diagnostic operations when the watched addresses are subject to processing in this way significantly reduces the complexities that would otherwise be associated in attempting to follow the instruction-by-instruction behaviour of an out-of-order processor or a processor which performs speculative processing. The technique is particularly suited to use in situations in which the block indicating circuitry is responsive to execution of a block of program instructions and the block signal is indicative of execution of a contiguous block of program instructions extending between a block starting address and a block ending address. Without the present technique the following of instruction-by-instruction behaviour would otherwise present significant difficulties and introduce significant potential constraints upon the system.

The watch points used can be individual addresses or ranges of addresses.

The system may utilise a single watchpoint for an individual address or a range of addresses, but it is desirable in most systems to provide the capability of providing multiple watchpoints in order to cope with the unpredictable situation that may be desired to diagnose or debug a particular system/problem.

It will be appreciated that the diagnostic circuitry could take a variety of different forms. One form is debug circuitry in which the trigger signal serves to trigger performance of a predetermined debug event (e.g. entry into debug mode, halting of the clock etc).

A problem which can arise when following the block-by-block behaviour of the system is that the relative ordering of the triggering of watchpoints may be difficult to follow without introducing additional complexity and/or overhead. As an example, one block of program instructions may contain multiple programmable diagnostic control points (e.g. trace start, trace stop, trace configuration), and the relative ordering of such programmable diagnostic control points is significant. Whilst the different control points may be associated with different addresses, a requirement to compare these addresses between what is an unknown (and potentially large) number of different programmable diagnostic control points in order to identify their relative ordering would represent a significant overhead and disadvantage. In preferred embodiments this issue is addressed by providing each of the programmable diagnostic control points with an associated ordering characteristic giving a relative order between the programmable diagnostic control points independently of the storage addresses associated therewith.

As one example, the programmable diagnostic control points could be provided with programmable priority values specifying their relative ordering and the comparator circuitry and diagnostic circuitry could be responsive to those priority values to relatively order the programmable diagnostic control points when these are simultaneously triggered. An alternative, and in many ways simpler and lower overhead approach, is to imply a relative ordering from the storage locations used to store data defining the different programmable diagnostic control points. Thus, when the programmable diagnostic control points are set up the relative ordering can be established by arranging that the control points are programmed in the appropriate relative order. When multiple such control points are simultaneously triggered, then the storage locations for the different control points can be used to establish the relative order therebetween.

This ordering approach is particularly useful when the programmable diagnostic control points are programmable trace control points, such as trace start and trace stop commands. In this circumstance it is significant in which order the programmable trace control points are encountered within a block of program instructions, as this has a significant effect on the behaviour of the trace mechanisms.

Another aspect provides a method of performing data processing operations under control of a sequence of program instructions, said method comprising the steps of:

in response to processing of a block of program instructions, generating a block signal indicative of processing of a contiguous block of program instructions extending between said block-starting address and said block-ending address;

in response to said block signal, generating a trigger signal if at least one programmable address being watched lies within said block of program instructions; and in response to said trigger signal, performing a diagnostic operation.

A further aspect provides apparatus for performing data processing operations under control of a sequence of program instructions, said apparatus comprising:

block indicating means for generating, in response to of a block of program instructions, a block signal indicative of processing of a contiguous block of program instructions extending between a block-starting address and a block-ending address.

comparator means coupled to said block indicating means for generating, in response to said block signal, a trigger signal if at least one programmable address being watched by said comparator means lies within said block of program instructions; and diagnostic means coupled to said comparator means for performing, in response to said trigger signal, a diagnostic operation.

A complementary aspect is a computer program used to control a general purpose computer to program the diagnostic mechanisms within the data processing system to perform in accordance with the above. The computer program in such a system is adapted to the block-by-block nature of the comparison and triggering which will be performed in order that the programming of the watch points is appropriate (e.g. with the appropriate ordering within the storage elements for those watchpoints) as well as the support for appropriate post-capture activity/analysis.

DESCRIPTION OF NON-LIMITING EXAMPLE EMBODIMENTS

Figure 1:
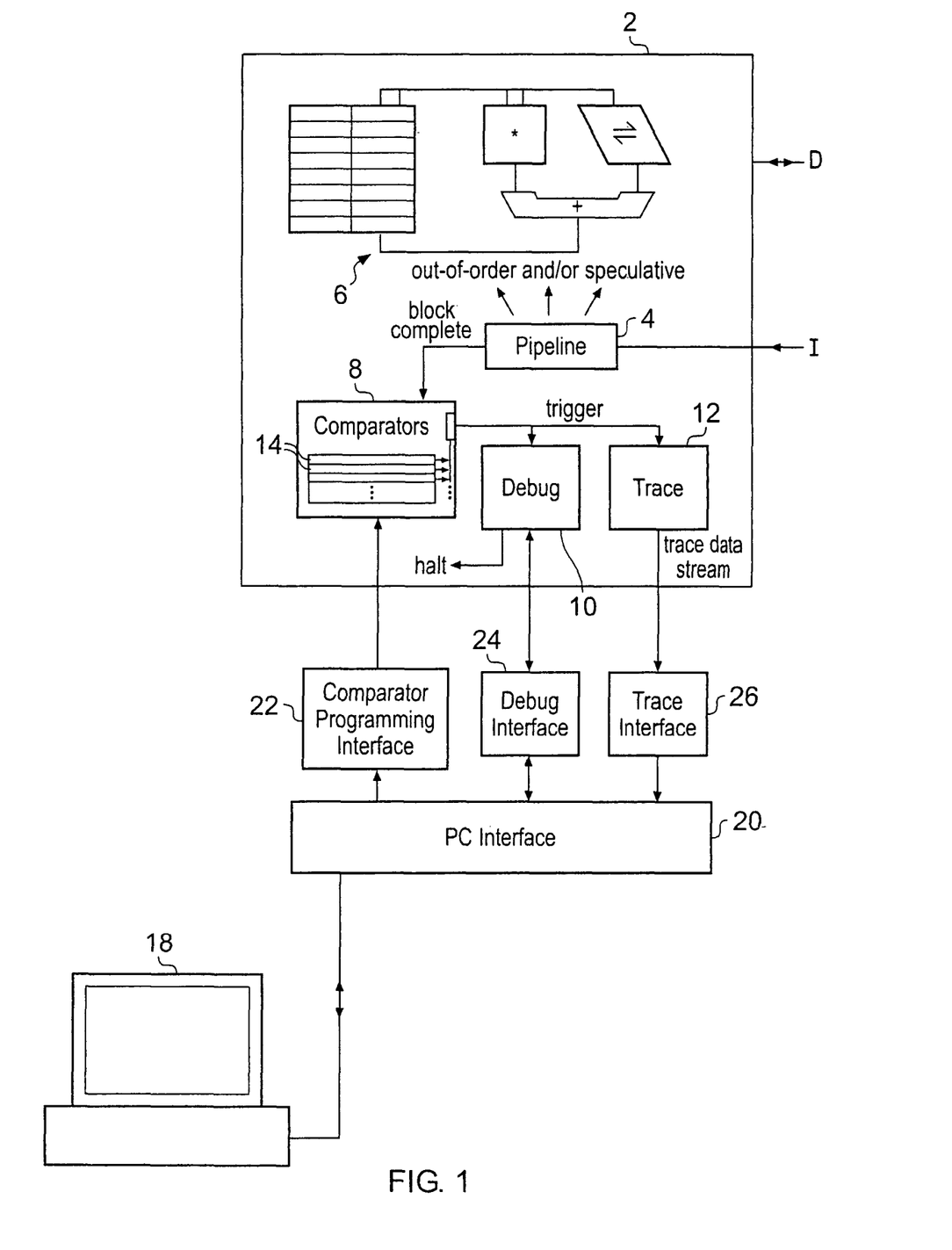
FIG. 1 illustrates a data processing system having built-in diagnostic mechanisms coupled to a general purpose computer for programming those diagnostic mechanisms and analysing the data therefrom.

FIG. 1 illustrates a data processing system comprising an integrated circuit 2 in the form of a processor for executing program instructions. The stream of instructions I are processed using an instruction pipeline 4 in accordance with known out-of-order and/or speculative execution techniques. Execution mechanisms 6 are provided for executing the processing operations specified by the program instructions. Data D fetched from within a memory (not illustrated, the memory may also contain instructions) is passed to the execution mechanisms 6 for manipulation and processing.

The integrated circuit 2 includes comparator circuitry 8, debug circuitry 10 and trace circuitry 12. The instruction pipeline 4 generates a block complete signal indicative of execution of a contiguous block of program instructions. The pipeline thus serves as block indicating circuitry in this example. In other examples, circuitry following accesses to data values stored within a memory (such as circuitry with a load store unit) can be used to generate a block indicating signal indicative of the data access within a block of data values.

The comparator circuitry 8 includes multiple storage elements 14, each storing data defining a corresponding watchpoint or watch range. The block complete signal, which specifies the range of memory addresses associated with the program instructions which have been executed (e.g. committed), is compared with data stored within the storage elements 14 and any matching watchpoints or watch ranges give rise to corresponding match signals which are supplied to trigger circuitry 16. The trigger circuitry 16 performs any necessary arbitrational ordering therebetween, and passes appropriate trigger signals out to the debug circuitry 10 and the trace circuitry 12. The debug circuitry 10 may be controlled by the trigger signal to perform a debug operation (e.g. generate a halt signal, enter debug mode, etc). The trace circuitry 12 can use the watchpoint or watch ranges to trigger programmable trace control point operations such as triggering trace start or trace stop. Ordering characteristics associated with the watchpoints or watch ranges are used to establish the relative ordering of those control points within the program order so that the tracing control operations can be performed with the appropriate and correct relative ordering.

A general purpose computer 18 operating under program control communicates via a computer interface 20 with comparator, debug and trace interfaces 22, 24, 26 which respectively communicate with the comparator circuitry 8, the debug circuitry 10 and the trace circuitry 12. The comparator interface 22 is used to program the watchpoints and watch ranges within the storage elements 14. The debug interface 24 is used to supply debug information and commands to the debug circuitry 10 and retrieve debug diagnostic data therefrom. The trace interface 26 is used to retrieve a trace data stream from the trace circuitry 12.

Figure 2:
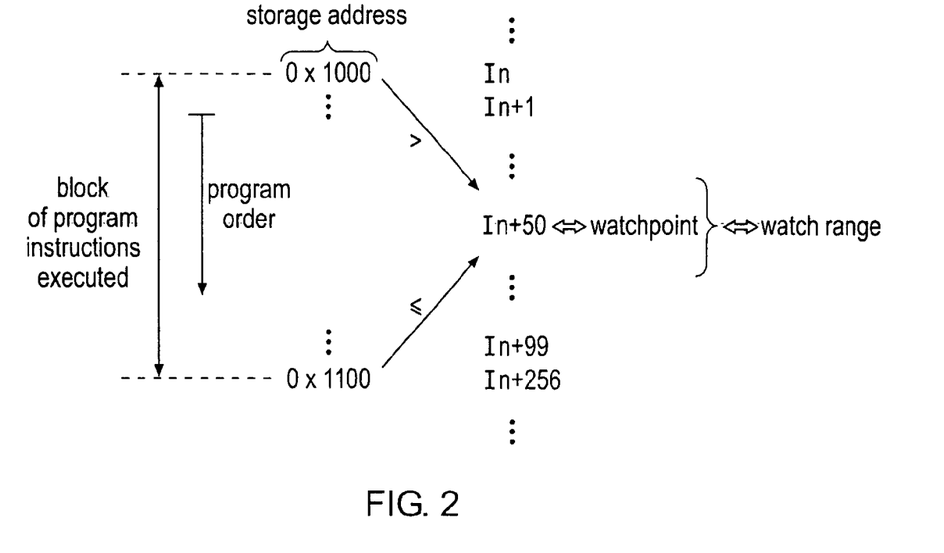
FIG. 2 schematically illustrates a sequence of program instructions being executed with associated watchpoints and watch ranges.

FIG. 2 illustrates a sequence of program instructions $I_n$ to $I_{n+256}$. These have respective storage addresses 0x1000 to 0x1100. This range of storage addresses comprises a block of program instructions, the execution of which is tracked by the pipeline 4 (or other block indicating circuitry).

In the example illustrated a watchpoint is set up at instruction $I_{n+50}$. A watch range over a range of addresses within this block, or spanning at least part of this block, could also be established. When the pipeline 4 generates the block complete signal indicating that the block instructions illustrated in FIG. 2 has been executed (or committed, decoded, issued or any other point in the pipeline), then a comparison is performed by the comparator circuitry 8 with each watchpoint or watch range programmed therein to establish if any of those watchpoints or watch ranges has elements that are between the bounds of the block of program instructions which have been executed. If any of the watchpoints or watch ranges are within that range, then they result in a trigger signal and the appropriate diagnostic operation or control point is accordingly actioned.

Figure 3:
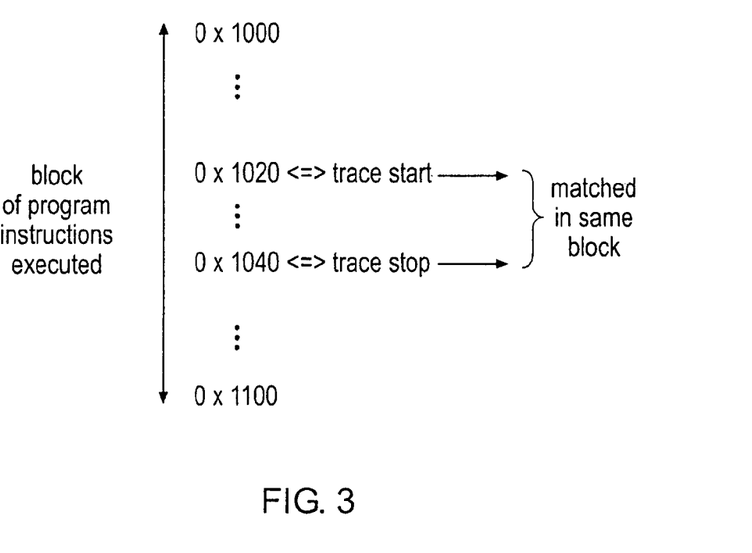
FIG. 3 schematically illustrates execution of a block of program instructions giving rise to the simultaneous triggering of multiple programmable trace control points.

FIG. 3 illustrates a block of program instructions which are executed and which contain two watchpoints corresponding respectively to a trace start control point and a trace stop control point. As the block complete signal will be generated in respect of the complete block, both of these trace control points will be triggered simultaneously and it is important to establish the relative order in which they should be processed. This should desirably be done without having to compare the addresses with which they are associated.

Figure 4:
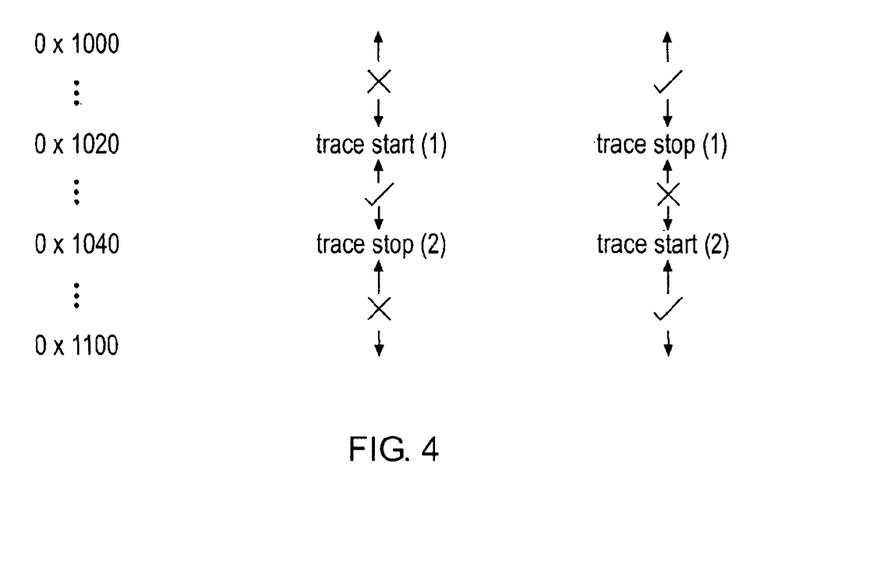
FIG. 4 illustrates different behaviour which is intended depending upon the different relative ordering of programmable trace control points within a block of instructions.

FIG. 4 schematically illustrates two possible behaviours which can be associated with the presence of a trace start and a trace stop control point within the same block of instructions which are tracked as one. In a first scenario, the trace start point occurs before the trace stop control point within the block indicating that the tracing should be switched off, temporarily switched on and then switched off again. In a second scenario, the trace stop control point is positioned in the program order before the trace start operation indicating that the tracing should be switched on, temporarily switched off, and then switched on again. These behaviours are significantly different. In some embodiments, it may be that when a block of instructions indicates that the tracing should be switched on for at least part of that block of instructions, then in practice the entire block of instructions would be traced as this will be significantly simpler to control. This can be relatively easily achieved in many embodiments by indicating in the trace data stream the starting address and the ending address of the block of program instructions which have been executed, since the remainder of the instructions and the program flow can be inferred from the static information defining the program that has been executed and other portions of the trace data stream.

Figure 5:
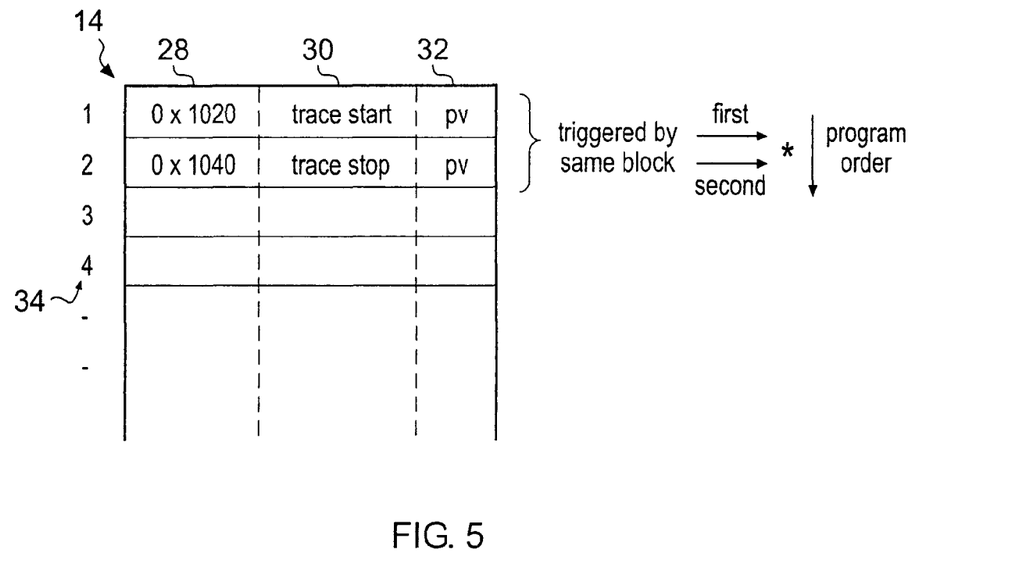
FIG. 5 schematically illustrates a plurality of programmable watchpoints stored within respective storage elements.

FIG. 5 schematically illustrates the storage elements 14 storing the watchpoints or watch ranges. These are illustrated as consolidated elements, but it will be appreciated that these elements could be dispersed at various locations and only "logically" form an element as shown. The watchpoints each have an associated storage address 28, specified action 30 and (optionally) a priority value 32. It will be appreciated that priority values 32 can be used to establish the relative order in which simultaneously triggered watchpoints/ranges should be processed. Alternatively the storage order within the storage elements indicated by the storage locations 34 can be used to infer that ordering (e.g. ascending, descending or some other predetermined order). In the example illustrated, two watchpoints are triggered by execution of the same block of instructions, but the relative storage order of those watchpoints is used to indicate that the trace start operation associated with address 0x1020 should be actioned before the trace stop operation associated with the address 0x1040 and that the trace stop operation should be the command persisting after execution of that block of instructions.

Figure 6:
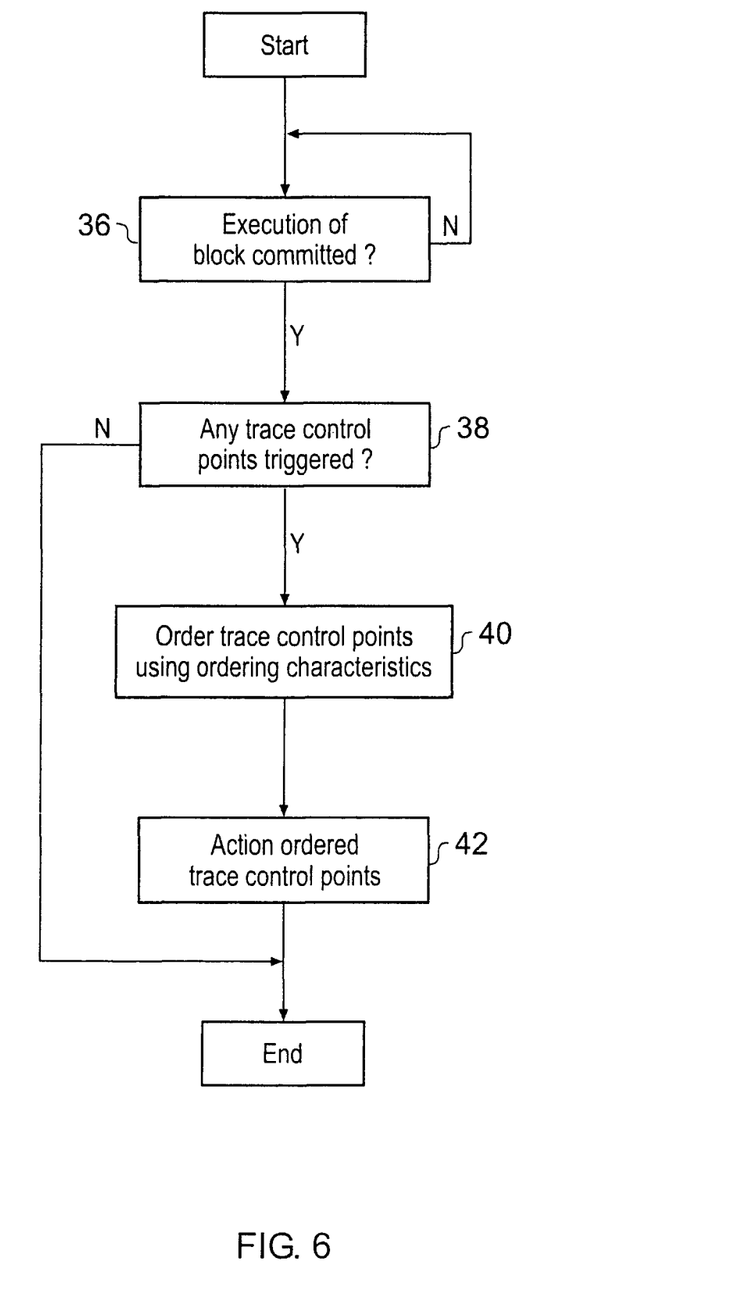
FIG. 6 is a flow diagram schematically illustrating the processing performed within the comparison circuitry in response to execution of a block of program instructions.

FIG. 6 is a flow diagram schematically illustrating the processing which can be performed by the comparator circuitry 8. At step 36, the system waits for a block complete signal indicating execution of a block of program instructions has been committed. At step 38 the comparator circuitry 8 determines whether any trace control points have been triggered for that block of program instructions. If there are any such trace control points, then step 40 serves to order those trace control points using ordering characteristics associated therewith. Step 42 then actions the ordered trace control points in their relative order.

Figure 7:
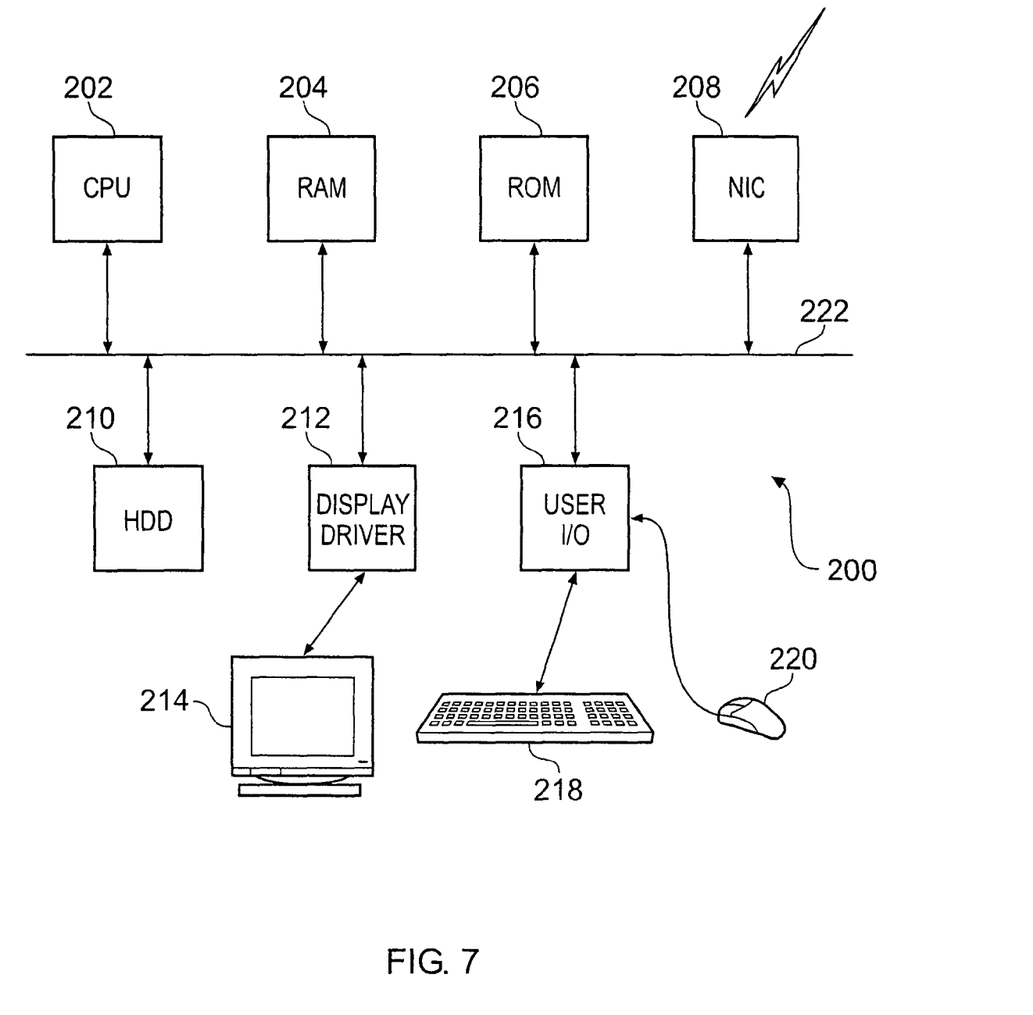
FIG. 7 is a diagram schematically illustrating a general purpose computer for use in association with the above techniques.

FIG. 7 schematically illustrates a general purpose computer 200 of the type that may be used to implement the above described techniques and in particular the programming of watchpoint or watch ranges with their ordering characteristics. The general purpose computer 200 includes a central processing unit 202, a random access memory 204, a read only memory 206, a network interface card 208, a hard disk drive 210, a display driver 212 and monitor 214 and a user input/output circuit 216 with a keyboard 218 and mouse 220 all connected via a common bus 222. In operation the central processing unit 202 will execute computer program instructions that may be stored in one or more of the random access memory 204, the read only memory 206 and the hard disk drive 210 or dynamically downloaded via the network interface card 208. The results of the processing performed may be displayed to a user via the display driver 212 and the monitor 214. User inputs for controlling the operation of the general purpose computer 200 may be received via the user input output circuit 216 from the keyboard 218 or the mouse 220. It will be appreciated that the computer program could be written in a variety of different computer languages. The computer program may be stored and distributed on a recording medium or dynamically downloaded to the general purpose computer 200. When operating under control of an appropriate computer program, the general purpose computer 200 can perform the above described techniques and can be considered to form an apparatus for performing the above described technique. The architecture of the general purpose computer 200 could vary considerably and FIG. 7 is only one example.

Although illustrative embodiments have been described in detail herein with reference to the accompanying drawings, it is to be understood that the claims are not limited to those embodiments, and that various changes and modifications can be effected therein by one skilled in the art without departing from the scope of the claims.

We claim:

1. Apparatus for performing data processing operations under control of a sequence of program instructions, said apparatus comprising: block indicating circuitry responsive to execution of a block of program instructions to generate a block signal indicative of execution of a contiguous block of program instructions extending between a block-starting address and a block-ending address; comparator circuitry coupled to said block indicating circuitry and responsive to said block signal to generate a trigger signal if at least one programmable address being watched by said comparator circuitry lies within said block of executed program instructions; and diagnostic circuitry coupled to said comparator circuitry and responsive to said trigger signal to perform a diagnostic operation.

2. Apparatus as claimed in claim 1, wherein said comparator circuitry is programmable to watch a range of addresses for execution of any program instruction having an associated storage address within said range of addresses.

3. Apparatus as claimed in claim 1, wherein said comparator circuitry is programmable to watch an individual address for execution of a program instruction having an associated storage address matching said individual address.

4. Apparatus as claimed in claim 1, wherein said comparator circuitry has a plurality of programmable watchpoints corresponding to respective programmable addresses being watched.

5. Apparatus as claimed in claim 1, wherein said diagnostic circuitry is debug circuitry and is responsive to said trigger signal to perform a predetermined debug event.

6. Apparatus as claimed in claim 1, wherein said apparatus performs out-of-order execution of at least some program instructions within said block of program instructions.

7. Apparatus as claimed in claim 1, wherein said apparatus performs speculative execution of at least some program instructions within said block of program instructions and said execution indicating circuitry generates said block signal after said speculative execution is committed.

8. Apparatus as claimed in claim 1, wherein said comparator circuitry is responsive to execution of a program instruction associated with a storage address matching a programmable diagnostic control point to trigger said diagnostic circuitry to perform a diagnostic control operation.

9. Apparatus as claimed in claim 8, wherein said programmable diagnostic control point is associated with an ordering characteristic giving a relative order between said programmable diagnostic control point and one or more other programmable diagnostic control points, said comparator circuitry being responsive to said ordering characteristic independently of a storage address associated with said programmable diagnostic control point to determine said relative order.

10. Apparatus as claimed in claim 8, wherein said diagnostic circuitry includes trace circuitry, said programmable diagnostic control point is a programmable trace control point and said trace circuitry is responsive to said trigger signal to control operation of a tracing mode of operation in which a stream of trace data indicative of data processing operations performed by said apparatus is generated.

11. Apparatus as claimed in claim 10, wherein said comparator circuitry is responsive to execution of a program instruction associated with a storage address matching a programmable trace control point to triggered said trace circuitry to one of:
   (i) start generating said stream of trace data; and
   (ii) stop generating said stream of trace data.

12. Apparatus as claimed in claim 10, wherein, when said block of program instructions includes a plurality of executed program instructions corresponding to programmable trace control points, said trace circuitry is triggered by said trigger signal from said comparator circuitry to take actions specified by said plurality of programmable trace control point following an order specified by said ordering characteristics.

13. Apparatus as claimed in claim 10, wherein said comparator circuitry has a plurality of programmable storage elements in to which data defining respective programmable diagnostic control points is programmable.

14. Apparatus as claimed in claim 8, wherein said ordering characteristic comprises which of said plurality of programmable storage elements is programmed with said data defining said programmable diagnostic control point, each of said programmable storage elements having an associated relative order with respect to other of said programmable storage elements.

15. Apparatus as claimed in claim 14, wherein said plurality of programmable storage elements are addressable in a sequence corresponding to said associated relative order.

16. Apparatus as claimed in claim 9, wherein said ordering characteristic is a programmable priority value associated with said programmable diagnostic control point.

17. A method of performing data processing operations under control of a sequence of program instructions, said method comprising the steps of:
   in response to execution of a block of program instructions, generating a block signal indicative of execution of a contiguous block of program instructions extending between said block-starting address and said block-ending address;
   in response to said block signal, generating a trigger signal if at least one programmable address being watched lies within said block of program instructions; and
   in response to said trigger signal, performing a diagnostic operation.

18. A method as claimed in claim 17, comprising watching a range of addresses for execution of any program instruction having an associated storage address within said range of addresses.

19. A method as claimed in claim 17, comprising watching an individual address for execution of a program instruction having an associated storage address matching said individual address.

20. A method as claimed in claim 17, comprising using a plurality of programmable watchpoints corresponding to respective programmable addresses being watched.

21. A method as claimed in claim 17, wherein said diagnostic operation is a predetermined debug event.

22. A method as claimed in claim 17, comprising performing out-of-order execution of at least some program instructions within said block of program instructions.

23. A method as claimed in claim 17, comprising performing speculative execution of at least some program instructions within said block of program instructions and said execution indicating circuitry generates said block signal after said speculative execution is committed.

24. A method as claimed in claim 17, comprising in response to execution of a program instruction associated with a storage address matching a programmable diagnostic control point, triggering said diagnostic circuitry to perform a diagnostic control operation.

25. A method as claimed in claim 24, wherein said programmable diagnostic control point is associated with an ordering characteristic giving a relative order between said programmable diagnostic control point and one or more other programmable diagnostic control points and, in response to said ordering characteristic independently of a storage address associated with said programmable diagnostic control point, determining said relative order.

26. A method as claimed in claim 24, wherein said programmable diagnostic control point is a programmable trace control point and, in response to said trigger signal, controlling operation of a tracing mode of operation in which a stream of trace data indicative of data processing operations performed by said apparatus is generated.

27. A method as claimed in claim 26, wherein, in response to execution of a program instruction associated with a storage address matching a programmable trace control point, triggering said trace circuitry to one of:
(i) start generating said stream of trace data; and
(ii) stop generating said stream of trace data.

28. A method as claimed in claim 26, wherein, when said block of program instructions includes a plurality of executed program instructions corresponding to programmable trace control points, said trigger signal triggers taking of actions specified by said plurality of programmable trace control point following an order specified by said ordering characteristics.

29. A method as claimed in claim 24, comprising using a plurality of programmable storage elements in to which data defining respective programmable diagnostic control points is programmable.

30. A method as claimed in claim 25, wherein said ordering characteristic comprises which of said plurality of programmable storage elements is programmed with said data defining said programmable diagnostic control point, each of said programmable storage elements having an associated relative order with respect to other of said programmable storage elements.

31. A method as claimed in claim 30, wherein said plurality of programmable storage elements are addressable in a sequence corresponding to said associated relative order.

32. A method as claimed in claim 25, wherein said ordering characteristic is a programmable priority value associated with said programmable diagnostic control point.

33. A non-transitory computer program recording medium storing a computer program to control a computer to program an integrated circuit to operate in accordance with a method as claimed in claim 17.

34. A non-transitory computer program recording medium storing a computer program to control a computer to program an integrated circuit to operate in accordance with a method as claimed in claim 25.

35. Apparatus for performing data processing operations under control of a sequence of program instructions, said apparatus comprising:
block indicating means for generating, in response to of a block of program instructions, a block signal indicative of execution of a contiguous block of program instructions extending between a block-starting address and a block-ending address;
comparator means coupled to said block indicating means for generating, in response to said block signal, a trigger signal if at least one programmable address being watched by said comparator means lies within said block of program instructions; and
diagnostic means coupled to said comparator means for performing, in response to said trigger signal, a diagnostic operation.

* * * * *